(12) United States Patent
Tsirkin

(10) Patent No.: US 9,304,766 B2
(45) Date of Patent: Apr. 5, 2016

(54) DETERMINING CHARACTER SEQUENCE DIGEST

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 66 days.

(21) Appl. No.: 14/186,381

(22) Filed: Feb. 21, 2014

(65) Prior Publication Data

US 2015/0242203 A1  Aug. 27, 2015

(51) Int. Cl.
*G06F 9/44* (2006.01)

(52) U.S. Cl.
CPC .................................. *G06F 8/71* (2013.01)

(58) Field of Classification Search
None
See application file for complete search history.

(56) References Cited

U.S. PATENT DOCUMENTS

| | | | |
|---|---|---|---|
| 7,346,780 B2 | 3/2008 | Sinha et al. | |
| 8,028,271 B2 | 9/2011 | deVries et al. | |
| 8,244,831 B1* | 8/2012 | McLennan et al. | 709/217 |
| 8,707,034 B1* | 4/2014 | Ryan | G06F 21/6218 707/784 |
| 2003/0121024 A1* | 6/2003 | Hill et al. | 717/107 |
| 2003/0131036 A1* | 7/2003 | Purcell | 708/505 |
| 2004/0031027 A1* | 2/2004 | Hiltgen | 717/170 |
| 2004/0199516 A1* | 10/2004 | Thames et al. | 707/100 |
| 2007/0022420 A1* | 1/2007 | Yamamoto et al. | 717/177 |
| 2007/0157171 A1* | 7/2007 | Eastham et al. | 717/121 |
| 2008/0196009 A1* | 8/2008 | Son et al. | 717/120 |
| 2008/0250403 A1* | 10/2008 | Moon et al. | 717/169 |
| 2010/0235374 A1* | 9/2010 | Bots et al. | 707/758 |
| 2013/0185697 A1 | 7/2013 | Farchi et al. | |
| 2014/0189674 A1* | 7/2014 | Nagao | 717/170 |

OTHER PUBLICATIONS

"Git-Patch-ID(1) Manual Page", Kernel.org, 2 Pages, Last updated Feb. 15, 2013 https://www.kernel.org/pub/software/scm/git/docs/git-patch-id.html.
"Open SSL: Documents, sha(3)", OpenSSL.org, 2 Pages, Last accessed Apr. 9, 2014 http://www.openssl.org/docs/crypto/sha.html.
Darcs-GSoC, darcs.net, 6 Pages http://darcs.net/GSoC, last accessed Dec. 19, 2013.

(Continued)

*Primary Examiner* — Wei Zhen
*Assistant Examiner* — Daxin Wu
(74) *Attorney, Agent, or Firm* — Lowenstein Sandler LLP

(57) ABSTRACT

Systems and methods for determining a character sequence digest. An example method may comprise: identifying, within a character sequence, one or more sections, wherein each section comprises a section header and one or more section bodies; performing the following operations for each identified section body: responsive to determining that the section body is not preceded by a section header, prepending a section header to the section body; calculating a section digest by applying a hash function to the section comprising the section header and the section body; and calculating a digest of the character sequence by applying a symmetric summing operation to one or more section digests.

20 Claims, 5 Drawing Sheets

(56) References Cited

OTHER PUBLICATIONS

Sheng, Yonghong, et al., "A Two-Phase Differential Synchronization Algorithm for Remote Files", ICA3PP 2010, Part I, LNCS 6081, pp. 65-78, Springer-Verlag Berlin, Heidelberg, 2010 http://link.springer.com/chapter/10.1007/978-3-642-13119-6_6.

Tsirkin, Michael S., "Re:[PATCH] Diff: Add a Config Option to Control Oderfile", lists-archives.com, Sep. 24, 2013 http://lists-archives.com/git/807703-diff-add-a-config-option-to-control-order-file.html.

* cited by examiner

DETERMINING CHARACTER SEQUENCE DIGEST

TECHNICAL FIELD

The present disclosure is generally related to computer systems, and is more specifically related to systems and methods for determining a character sequence digest.

BACKGROUND

Computer program updates may be distributed in the form of patches. A patch may be provided by a file comprising one or more fragments of computer code (e.g., source code or executable code) and/or data. A source code patch may be provided by a file comprising a listing of differences of an original source code file and a corresponding updated source code file. A specialized program (e.g., GNU patch utility) may apply one or more patch files to a source code tree on a target computer system, producing patched versions of the affected source code files.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for determining character sequence digests (e.g., for identifying code patches).

A code patch may be provided by a file comprising a listing of differences of an original code file and a corresponding updated code file. A specialized program (e.g., GNU patch utility) may apply one or more patch files to a source code tree on a target computer system, producing patched versions of the affected source code files.

For change management purposes, a patch file may be identified by a hash-based digest of the patch file contents. However, conventional methods of determining patch file identifiers may produce different digest values for two patch files which are identical except for the order of text sections within the file.

Aspects of the present disclosure address the above noted and other deficiencies by providing a method of determining a patch file digest which is insensitive to changing the order of text sections within the patch file. Various aspects of the above referenced methods and systems are described in details herein below by way of examples, rather than by way of limitation.

Figure 1:
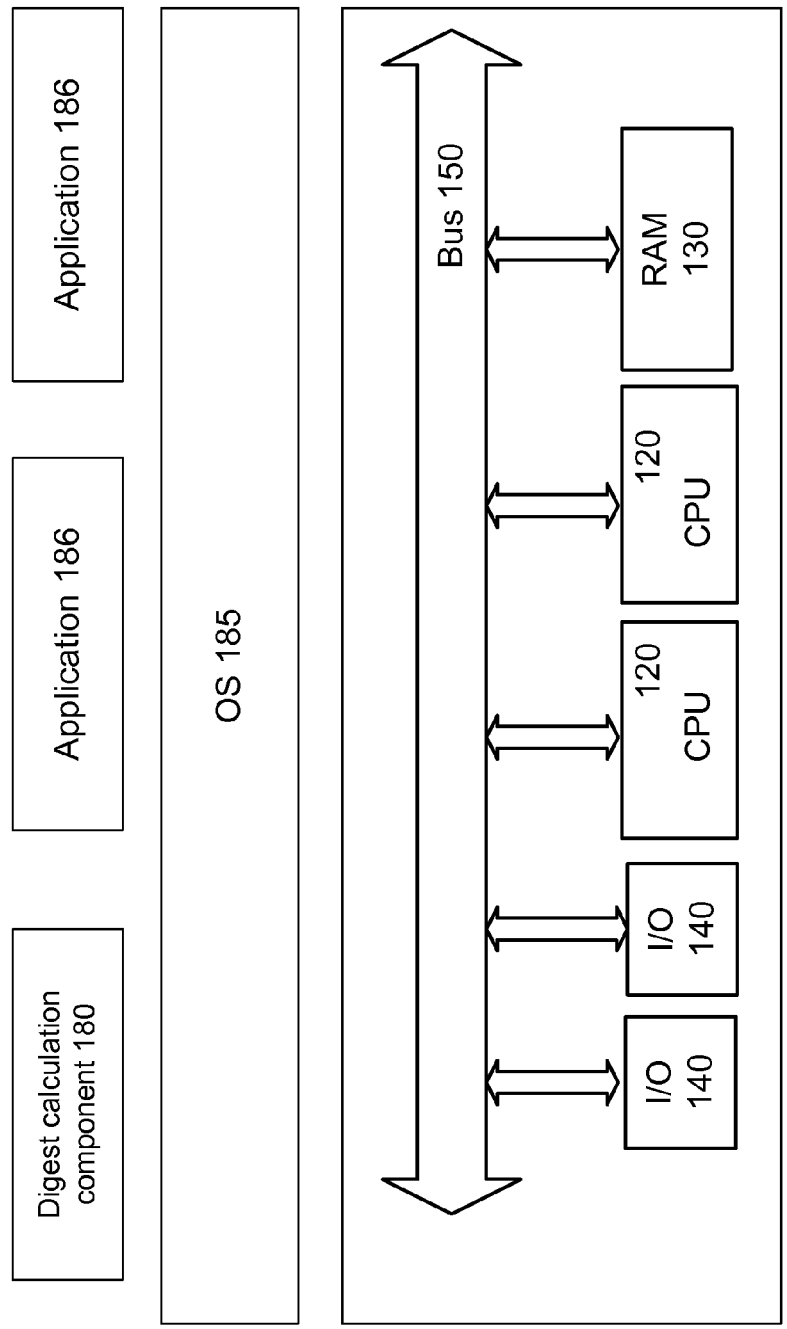
FIG. 1 depicts a high-level component diagram of an example computer system, in accordance with one or more aspects of the present disclosure.

FIG. 1 depicts a high-level component diagram of an illustrative example of a computer system 100 that may be programmed to perform the method of determining a character sequence digest, in accordance with one or more aspects of the present disclosure. Computer system 100 may comprise one or more physical processors 120 communicatively coupled to memory devices 130 and input/output (I/O) devices 140 via a system bus 150.

"Processor" herein refers to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

In the illustrative example of FIG. 1, computer system 100 may execute an operating system 185 and one or more applications 186. Alternatively, computer system 100 may run one or more virtual machines (not shown in FIG. 1), by executing a software layer, often referred to as "hypervisor," above the hardware and below the virtual machines. The hypervisor may abstract the physical layer, including processors, memory, and I/O devices, and present this abstraction to the virtual machines as virtual devices. A virtual machine may execute a guest operating system and one or more applications.

In accordance with one or more aspects of the present disclosure, computer system 100 may execute a digest calculation component 180 programmed to perform the method of determining a character sequence digest. In an illustrative example, digest calculation component 180 may be implemented as a user space application running under operating system 185. Alternatively, digest calculation component 180 may be implemented as a component of operating system 185 executed in the kernel space, the user space, or both.

Figure 2:
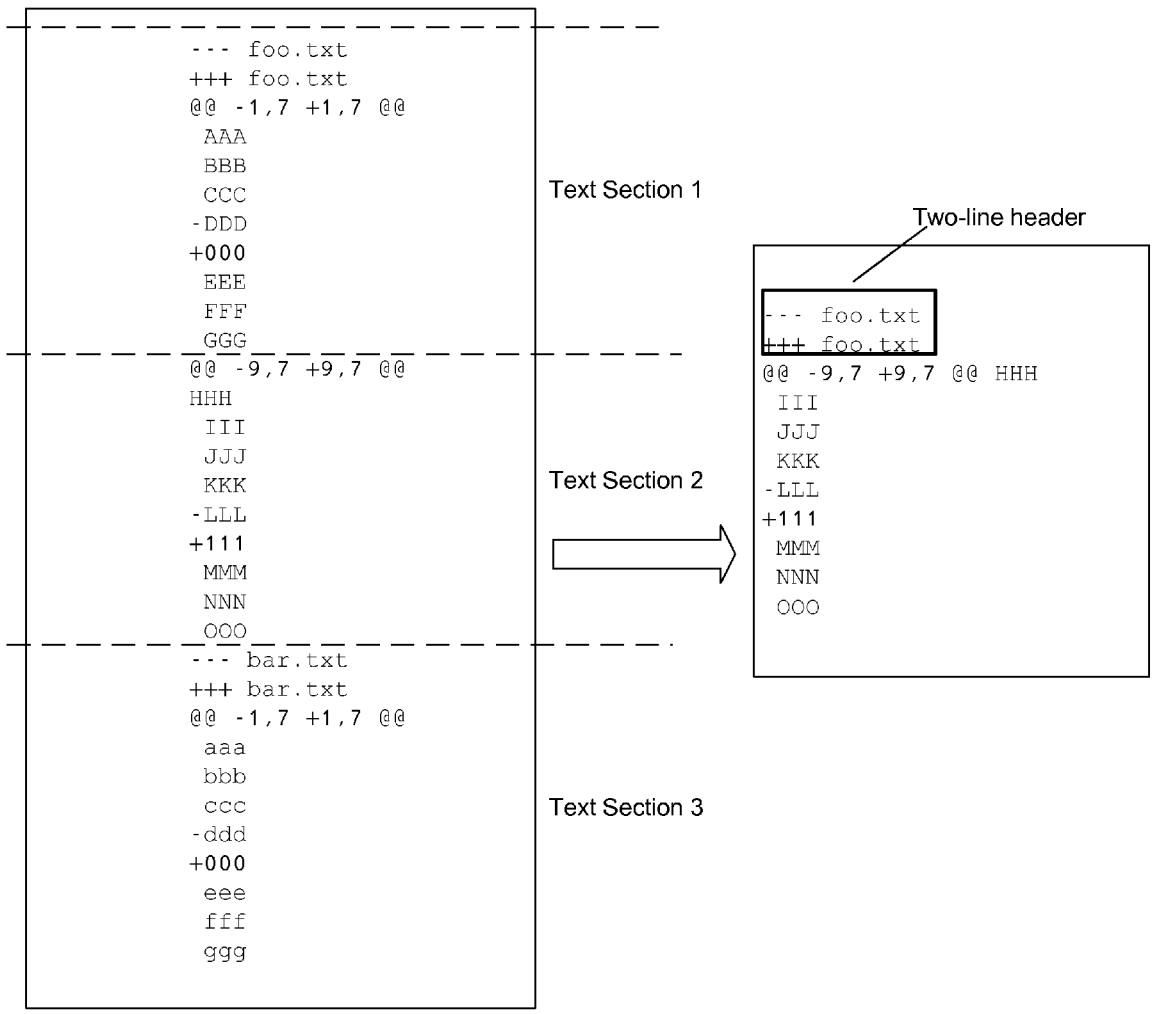
FIG. 2 schematically illustrates an example source code patch, in accordance with one or more aspects of the present disclosure.

Digest calculation component 180 may process a character sequence (e.g., a code patch file) in order to produce a hash-based digest of the character sequence, as described in more details herein. In certain implementations, a code patch may be provided by an output of a GNU diff utility. FIG. 2 schematically illustrates an example of a code patch file.

In the example of FIG. 2, the code patch file contains several text sections. Each text section defines the changes to be applied to an original file specified in a two-line section header, in which the original file name is preceded by "---" and the new file name is preceded by "+++". The section header may be followed by one or more section bodies (also referred to as "hunks" in GNU diff-related product literature) describing the line differences in the two files defined by the section header.

Each section body may comprise a line range definition followed by line additions, line deletions, and/or contextual lines. Unmodified (contextual) lines may be preceded by a space character, the lines to be added may be preceded by a plus sign (+), and the lines to be deleted may be preceded by a minus sign (−). Line modification may be represented by a combination of deletion and addition of the respective one or more lines.

A line range definition may be surrounded by two groups of double-@ signs, and may comprise two line ranges conforming to the following format:

@@−l,s+l,s @@ optional section heading

Each line range may comprise two integers representing a starting line and a number of lines, divided by a comma, and may be preceded by a minus or plus sign. The original file line range may be preceded by a minus symbol, and new file line range may be preceded by a plus symbol, wherein l represents the starting line number and s represents the number of lines to which the change section applies, for each respective file. The line range definition may optionally be followed by a section heading string.

In accordance with one or more aspects of the present disclosure, digest calculation component 180 may process a code patch file and produce a hash-based digest which is insensitive to changing the order of sections within the code patch file.

In an illustrative example of FIG. 2, digest calculation component 180 may identify, within the code patch file, one or more text sections. Each text section may comprise a section header and or more section bodies.

Responsive to identifying each section body, digest calculation component 180 may prepend a two-line section header identifying the original and the new file names to the section body, if the latter is not preceded by a section header in the original code patch file (e.g., Text Section 2 of FIG. 2).

Digest calculation component 180 may then calculate the section digests, by applying a pre-defined hash function (e.g., SHA-1 cryptographic hash function) to each text section comprising a section header and a section body. Digest calculation component 180 may then produce the digest of the code patch by calculating a symmetric sum of the text section digests, as schematically illustrated by FIG. 2. One or more carry bits that might have been set by the summing operation may be discarded.

In another illustrative example, digest calculation component 180 may employ a multi-stage algorithm for calculating the digest values. In certain implementations, SHA-1 digest calculation of a byte stream that is not completely stored in memory may comprise three stages: initializing the digest by a pre-defined value, sequentially updating the previously initialized digest by processing a plurality of characters, and finalizing the digest. In accordance with one or more aspects of the present disclosure, digest calculation component 180 may employ the three-stage digest calculation method for determining a character sequence digest within a single pass over the character sequence, thus improving the processing efficiency of the method.

In certain implementations, digest calculation component 180 may initialize the code patch digest with a pre-defined value (e.g., zero value). Digest calculation component 180 may then perform a single pass over the character sequence, identify one or more text sections comprising a section header (e.g., represented a two-line header comprising the original file name preceded by "−−−" and the new file name is preceded by "+++", as described in more details herein above) and one or more section bodies (e.g., comprising a line range definition which may be immediately followed by the line additions, line deletions, and/or contextual lines, as described in more details herein above). Responsive to identifying a section header, digest calculation component 180 may initialize the header digest with a pre-defined value (e.g., zero value) and then calculate the header digest by applying the hash function to the section header.

Responsive to identifying, within the code patch file, each section body, digest calculation component 180 may initialize the section digest with the value of the previously calculated digest of the corresponding section header, and then update the section digest by applying the hash function to the section body. Digest calculation component 180 may finalize the section digest upon processing all bytes of the section body.

Responsive to completing the pass over the code patch file, digest calculation component 180 may produce the digest of the code patch by calculating a symmetric sum of the text section digests. One or more carry bits that might have been set by the summing operation may be discarded.

Other implementations of the methods described herein may employ various hash functions and/or various methods of symmetric sum calculation.

Figure 3:
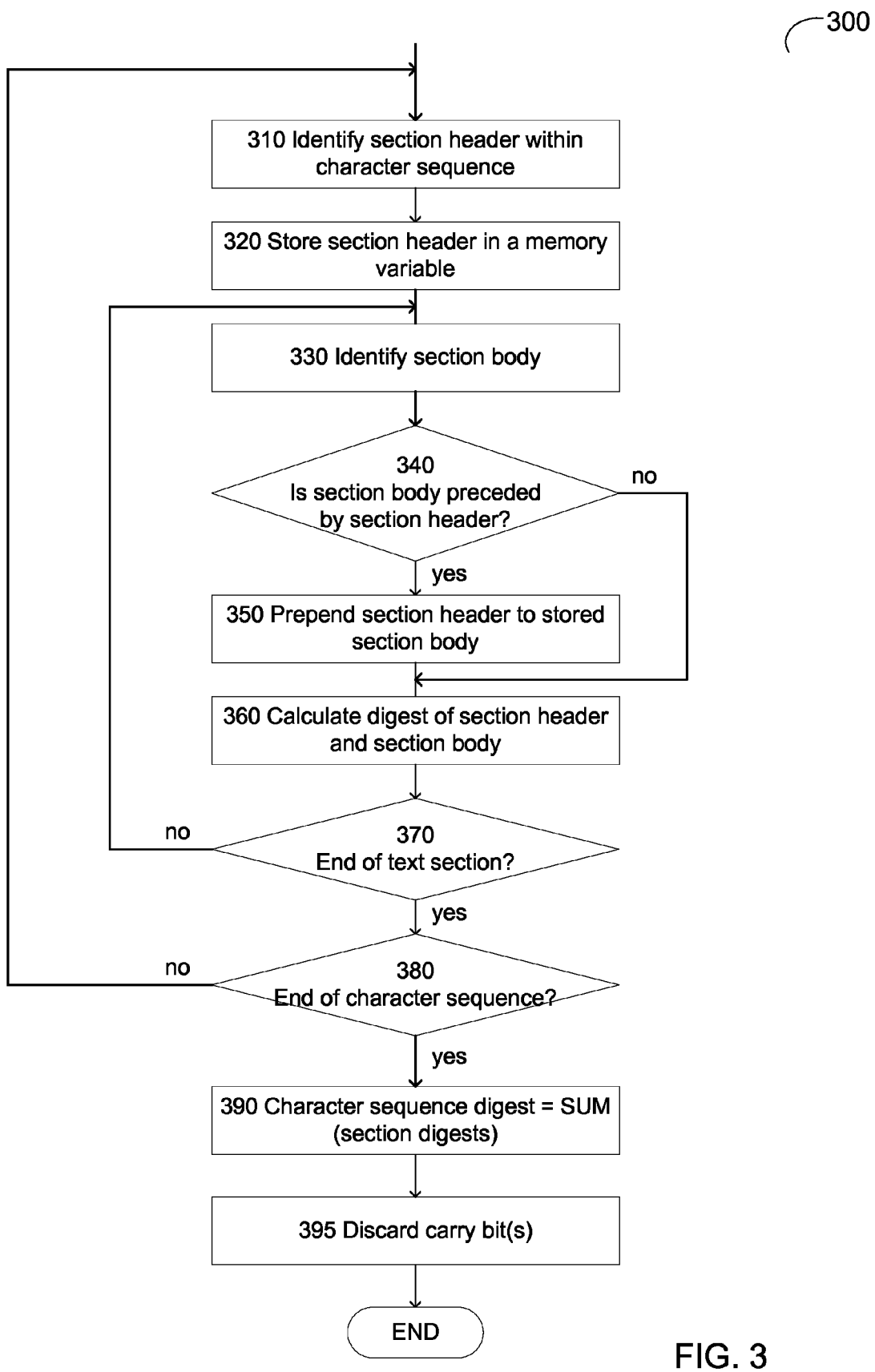
FIGS. 3-4 depict flow diagrams of example methods for determining a character sequence digest, in accordance with one or more aspects of the present disclosure.

FIG. 3 depicts a flow diagram of an example method 300 for determining a character sequence digest. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more physical processors of the computer system executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a computer system may identify, within a character sequence, a text section comprising a section header and or more section bodies, as described in more details herein above. For each identified section, the computer system may perform the operations referenced by blocks 320-370.

At block 320, the computer system may store the section header in a memory variable.

At block 330, the computer system may identify a section body within the current section, by identifying a line range definition, as described in more details herein above.

At blocks 340-350, the computer system may prepend the stored section header to the current section body, if the latter is not preceded by a section header in the original code patch file, as described in more details herein above.

At block 360, the computer system may calculate a section digest, by applying a pre-defined hash function (e.g., SHA-1 cryptographic hash function) to the text section comprising a section header and a section body.

Responsive to ascertaining, at block 370, that the end of the current text section has been reached, the method may loop back to block 330; otherwise, the processing may continue at block 380.

Responsive to ascertaining, at block 380, that the end of the character sequence has been reached, the method may loop back to block 310; otherwise, the processing may continue at block 390.

At block 390, the computer system may determine the character sequence digest by applying a symmetric summing operation (e.g., the addition operation) to the text section digests, as described in more details herein above.

At block 395, the computer system may discard one or more carry bits that might have been set by the symmetric summing operation. Responsive to completing the operations schematically referenced by block 395, the method may terminate.

Figure 4:
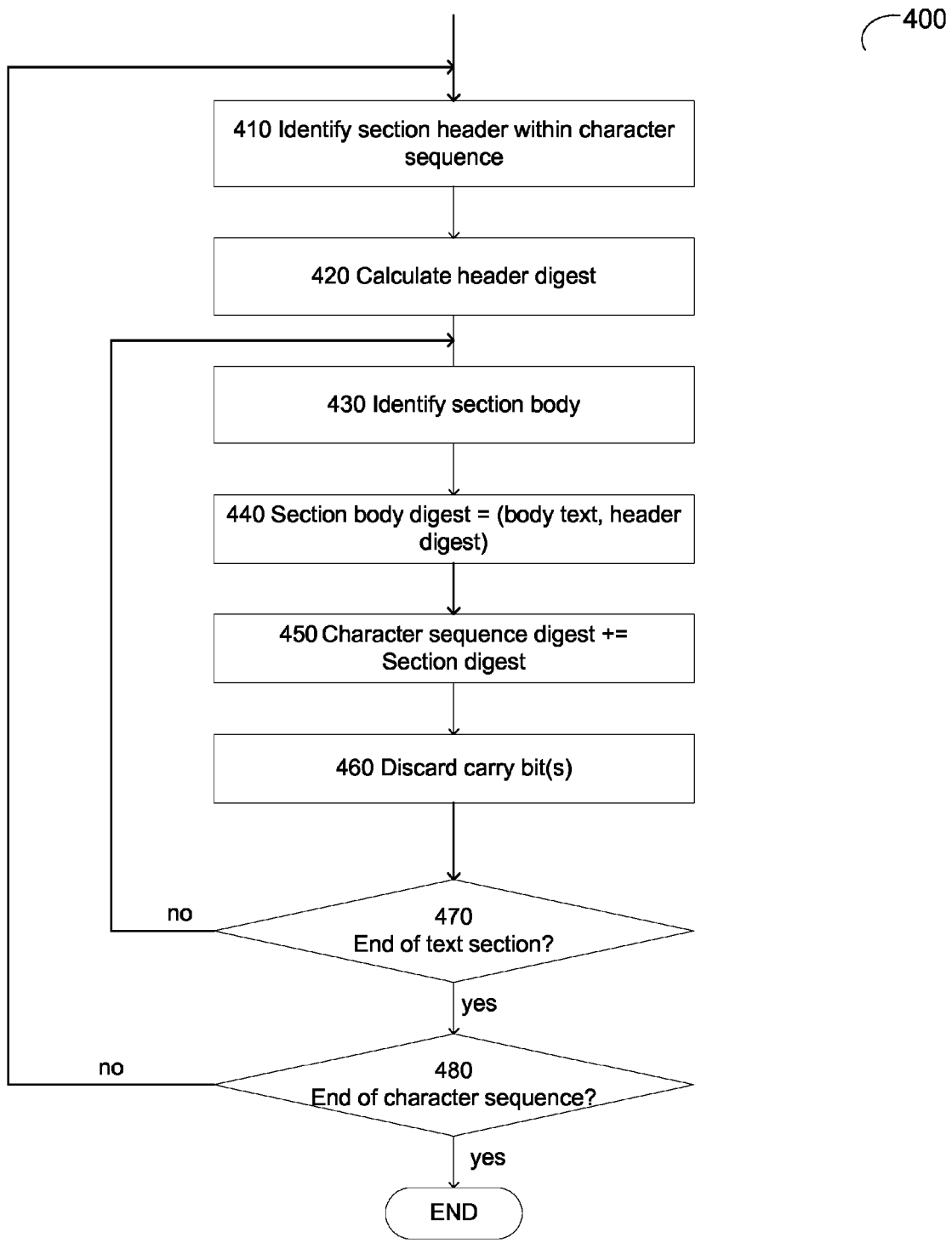

FIG. 4 depicts a flow diagram of an example method 400 for determining a character sequence digest. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its individual functions, routines, subroutines, or operations may be performed by one or more physical processors of the computer system executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a computer system may identify, within a character sequence, a text section comprising a section header and or more section bodies, as described in more details herein above. For each identified section, the computer system may perform the operations referenced by blocks 420-470.

At block 420, the computer system may calculate the section header digest by applying the hash function to the section header, as described in more details herein above.

At block 430, the computer system may identify a section body within the current section, by identifying a line range definition, as described in more details herein above.

At block 440, the computer system may calculate a section body digest, by initializing a pre-defined hash function with the value of the header digest and applying the hash function to the text of the section body, as described in more details herein above.

At block 450, the computer system may apply a symmetric summing operation (e.g., the addition operation) to add the calculated digest of the section body to the resulting value of the character sequence digest, as described in more details herein above.

At block 460, the computer system may discard one or more carry bits that might have been set by the symmetric summing operation.

Responsive to ascertaining, at block 470, that the end of the current text section has been reached, the method may loop back to block 430; otherwise, the processing may continue at block 480.

Responsive to ascertaining, at block 480, that the end of the character sequence has been reached, the method may loop back to block 410; otherwise, the method may terminate.

Figure 5:
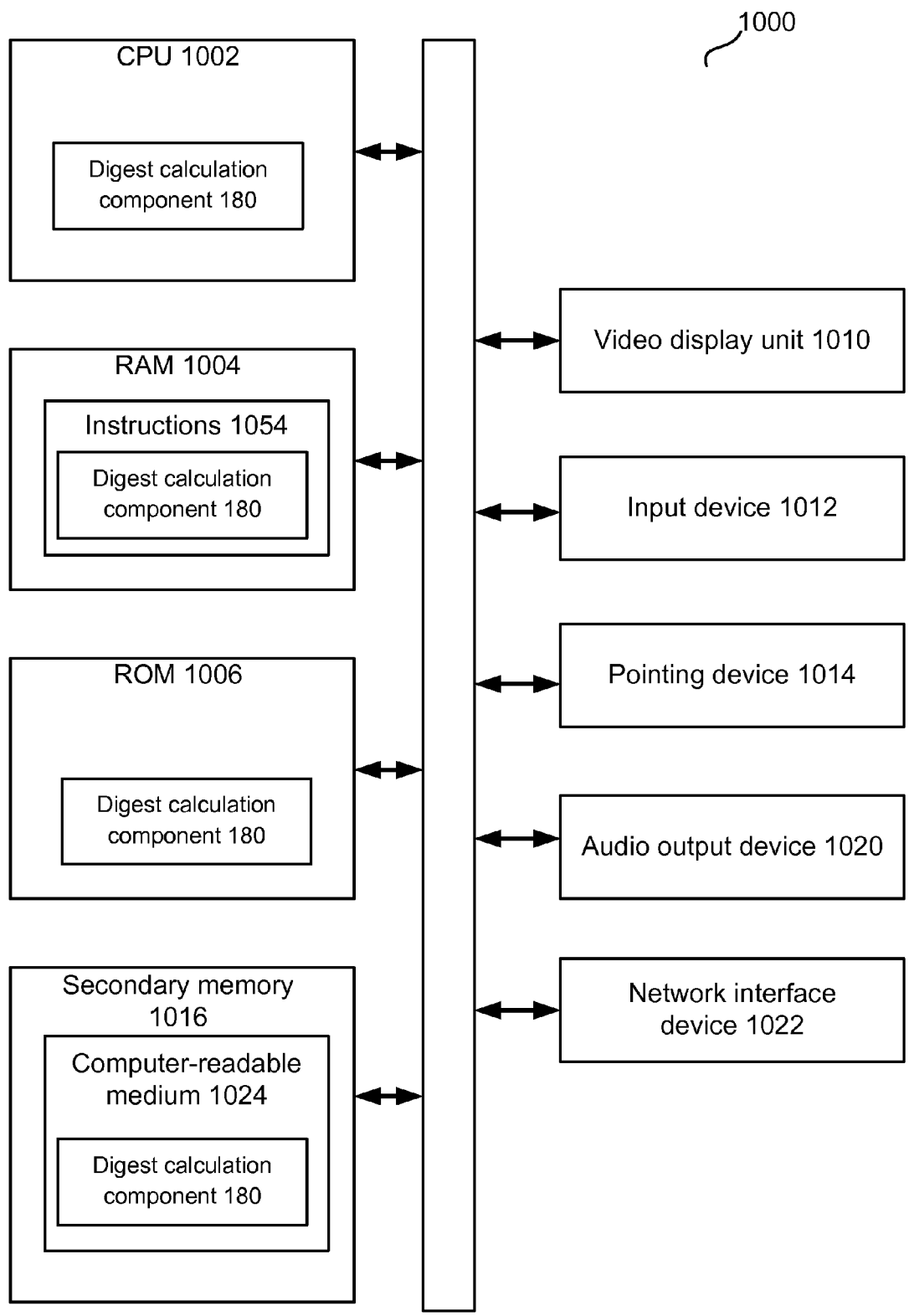
FIG. 5 depicts a block diagram of an illustrative computer system operating in accordance with examples of the invention.

FIG. 5 depicts an example computer system 1000 which can perform any one or more of the methods described herein. In illustrative example, computer system 1000 may correspond to computer system 100 of FIG. 1.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further comprise a network interface controller 1022. Computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may comprise a non-transitory computer-readable storage medium 1024 on which may be stored instructions 1054 encoding any one or more of the methods or functions described herein, including instructions encoding digest calculation component 180 of FIG. 1 implementing method 300 for determining a character sequence digest.

Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the methods and/or each of their individual functions, routines, subroutines, or operations. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

What is claimed is:

1. A method, comprising:
   identifying by one or more processors, within a character sequence, a first section and a second section, wherein the first section comprises a section header, a first section body that follows the section header, and a second section body that follows the first section body;
   responsive to determining, by the one or more processors, that there is no section header between the first section body and the second section body, prepending to the second section body, by the one or more processors, the section header that precedes the first section body;
   calculating, by the one or more processors, a first section digest by applying a hash function to the first section, and a second section digest by applying the hash function to the second section; and
   calculating, by the one or more processors, a digest of the character sequence by applying a symmetric summing operation to the first section digest and the second section digest.

2. The method of claim 1, wherein the hash function is provided by a SHA-1 function.

3. The method of claim 1, wherein the symmetric summing operation is provided by an addition operation.

4. The method of claim 1, wherein identifying the first section comprises identifying a first pre-defined text pattern.

5. The method of claim 1, further comprising:
   discarding one or more carry bits that have been set by the symmetric summing operation.

6. The method of claim 1, wherein the character sequence represents a code patch.

7. The method of claim 6, wherein the section header comprises at least one of: a name of an original file or a name of a new file.

8. The method of claim 6, wherein the second section body comprises at least one of: a line range definition for an original file or a line range definition for a new file.

9. A system comprising:
   a memory; and
   one or more processors, operatively coupled to the memory, to:
      identify, within a character sequence, a first section and a second section, wherein the first section comprises a section header, a first section body that follows the section header, and a second section body that follows the first section body;
      responsive to determining that there is no section header between the first section body and the second section body, prepend to the second section body the section header preceding the first section body;
      calculate a first section digest by applying a hash function to the first section, and a second section digest by applying the hash function to the second section; and
      calculate a digest of the character sequence by applying a symmetric summing operation to the first section digest and the second section digest.

10. The system of claim 9, wherein the hash function is provided by a SHA-1 function.

11. The system of claim 9, wherein the character sequence represents a code patch.

12. The system of claim 11, wherein the section header comprises at least one of: a name of an original file or a name of a new file.

13. The system of claim 11, wherein the second section body comprises at least one of: a line range definition for an original file or a line range definition for a new file.

14. The system of claim 9, wherein the one or more processors are further to discard one or more carry bits that have been set by the symmetric summing operation.

15. A computer-readable non-transitory storage medium comprising executable instructions that, when executed by one or more processors, cause the one or more processors to:
   identify by the one or more processors, within a character sequence, a first section and a second section, wherein the first section comprises a section header, a first section body that follows the section header, and a second section body that follows the first section body;
   responsive to determining that there is no section header between the first section body and the second section body, prepend to the second section body, by the one or more processors, the section header preceding the first section body;
   calculate, by the one or more processors, a first section digest by applying a hash function to the first section, and a second section digest by applying the hash function to the second section; and
   calculate, by the one or more processors, a digest of the character sequence by applying a symmetric summing operation to the first section digest and the second section digest.

16. The computer-readable non-transitory storage medium of claim 15, further comprising executable instructions causing the one or more processors to:
   repeat, until an end of the character sequence is reached, the operations of identifying a section and calculating a digest for the section.

17. The computer-readable non-transitory storage medium of claim 15, wherein the hash function is provided by a SHA-1 function.

18. The computer-readable non-transitory storage medium of claim 15, wherein the symmetric summing operation is provided by an addition operation.

19. The computer-readable non-transitory storage medium of claim 15, wherein identifying the first section comprises identifying a first pre-defined text pattern.

20. The computer-readable non-transitory storage medium of claim 15, further comprising executable instructions causing the one or more processors to discard one or more carry bits that have been set by the symmetric summing operation.

\* \* \* \* \*